(12) United States Patent  (10) Patent No.: US 8,368,350 B2
Iwanaga et al.  (45) Date of Patent: Feb. 5, 2013

(54) CONTROL SYSTEM, CONTROL DEVICE AND CABLE CONNECTION STATE DETERMINING METHOD

(75) Inventors: Takehito Iwanaga, Kobe (JP); Takehiro Uchida, Toyota (JP)

(73) Assignees: Fujitsu Ten Limited, Kobe (JP); Toyota Jidosha Kabushiki Kaisha, Toyota (JP)

( * ) Notice: Subject to any disclaimer, the term of this patent is extended or adjusted under 35 U.S.C. 154(b) by 660 days.

(21) Appl. No.: 12/563,736

(22) Filed: Sep. 21, 2009

(65) Prior Publication Data

US 2010/0079105 A1   Apr. 1, 2010

(30) Foreign Application Priority Data

Sep. 26, 2008 (JP) ................................. 2008-247793

(51) Int. Cl.
*H02J 7/00* (2006.01)
(52) U.S. Cl. ........................................ 320/109; 320/111
(58) Field of Classification Search .................... 320/109
See application file for complete search history.

(56) References Cited

U.S. PATENT DOCUMENTS

| 5,637,977 | A | * | 6/1997 | Saito et al. | ..................... | 320/109 |
| 5,751,135 | A |  | 5/1998 | Fukushima et al. | | |
| 5,820,395 | A |  | 10/1998 | Hashizawa | | |
| 6,700,352 | B1 | * | 3/2004 | Elliott et al. | ................... | 320/130 |
| 2009/0102433 | A1 |  | 4/2009 | Kamaga | | |

FOREIGN PATENT DOCUMENTS

| JP | A-09-161882 | 6/1997 |
| JP | A-09-161898 | 6/1997 |
| JP | A-2009-071989 | 4/2009 |
| JP | A-2009-106053 | 5/2009 |

OTHER PUBLICATIONS

SAE International Agenda, PHEV Charge Coupler & Cord Set Practice, 2007, Host-Gery Kissel, SAE Automotive Headquarters—Troy, Michigan.
"Ace Charging System," Advanced Conductive EV Charging System, 2006, Tesla Motors Inc., pp. 1-24.
"Electric vehicle conductive charging system: General requirements," *Japan Electric Vehicle Association Standard*, 2001, pp. 1-29. (with partial translation).

* cited by examiner

*Primary Examiner* — Edward Tso
*Assistant Examiner* — Robert Grant
(74) *Attorney, Agent, or Firm* — Oliff & Berridge, PLC

(57) ABSTRACT

A vehicle-side connector included at one end of a cable through which a power source outside a vehicle feeds a power storage device, includes a signal pin, a resistive element R2 connected to the signal pin at one end, a switch connected in series to the resistive element R2 at one end and grounded at the other end, and a resistive element R3 connected in parallel to the switch. The switch changes from an ON state to an OFF state upon depression of a depression portion located on the vehicle-side connector. The vehicle includes a resistive element R4 whose one end is connectable to the signal pin and other end is grounded and a control device which determines a state of connection of the cable on the basis of a signal voltage value input from a signal line electrically connected to the signal pin.

7 Claims, 11 Drawing Sheets

CONTROL SYSTEM, CONTROL DEVICE AND CABLE CONNECTION STATE DETERMINING METHOD

This application is based on an application No. 2008-247793 filed in Japan, the contents of which are hereby incorporated by reference.

BACKGROUND OF THE INVENTION

1. Field of the Invention

The present invention relates to a control system for charging on-board power storage devices for driving vehicles, to a control device, and to a cable connection state determining method.

2. Description of the Related Art

Attention has been given in recent years to environment-conscious vehicles such as electric vehicles, hybrid vehicles, and fuel cell vehicles. These vehicles are equipped with electric motors for generating power to drive the vehicles and power storage devices for storing power supplied to the electric motors. Hybrid vehicles are further equipped with internal combustion engines as power sources in addition to the electric motors, while fuel cell vehicles are equipped with fuel cells as vehicle-driving DC power sources.

Some of the foregoing vehicles are known to be able to charge the vehicle-driving power storage devices directly by domestic power sources. For example, power is supplied from the domestic power source to the power storage device through a charging cable connected between a receptacle of commercial power source in a residential house and a charging port of the vehicle. Those vehicles capable of charging the on-board power storage devices directly by external power sources are referred to as "plug-in vehicles."

Japanese Unexamined Patent Publication No. 9-161882 proposes an electric-automobile charging connector that provides for improved resistance against drop impact of a feeder side connector repeatedly fitted to a receiving side connector.

Standards for the plug-in vehicles are established in the United States by "SAE Electric Vehicle Conductive Charge Coupler" (November 2001, SAE Standards, SAE International).

In Japan, the standards for the plug-in vehicles are established by "General Requirements for Electric Vehicle Conductive Charging System (Mar. 29, 2001, Japan Electric Vehicle Association Standard)."

"SAE Electric Vehicle Conductive Charge Coupler" and "General Requirements for Electric Vehicle Conductive Charging System" define standards regarding, for example, control pilot.

The control pilot is defined as a control line connecting a control circuit for EVSE (Electric Vehicle Supply Equipment), which supplies power from a premises wiring to the vehicle, and a ground portion of the vehicle through a vehicle-side control circuit.

A pilot signal transmitted through the control line is used a basis for, for example, detecting the state of connection of the charging cable, determining whether power can be supplied from the power source to the vehicle, and detecting the rated current of the EVSE.

However, "SAE Electric Vehicle Conductive Charge Coupler" and "General Requirements for Electric Vehicle Conductive Charging System" do not particularly define details of how to detect a break of the control line through which the pilot signal is transmitted.

For example, when the potential of the control line is at ground level, this cannot be differentiated between a break of the control line, failure of the power source outside the vehicle, unintentional disconnection of the charging cable off the receptacle, and other causes.

Thus, when the charging cable is connected but the power storage device is not charged, the user is not aware of this situation until the power storage device is in a discharged state. This forces the hybrid vehicles to run only on fuel such as gasoline to the detriment of mileage.

The pilot signal is a requisite signal for controlling charging of plug-in vehicles. It is therefore vital to detect abnormality in the pilot signal, especially a break of the control line through which the pilot signal is transmitted.

In order to secure that a control device at the vehicle side is able to detect whether the charging cable is connected to the vehicle, the charging cable is provided with a connection determination circuit that indicates an ON state as normal state. This connection determination circuit includes a switch connected in series with a resistive element and a resistor so that the control device at the vehicle side is able to detect whether the charging cable is connected to the vehicle on the basis of output from the connection determination circuit.

However, since the switch is configured to turn off in conjunction with an operation portion for connecting and disconnecting the charging cable to and off the vehicle, such a problem arose that differentiation cannot be made between a state in which the charging cable has been disconnected off the vehicle and a state in which the operation portion is being depressed while the charging cable is being connected to the vehicle.

Specifically, the operation portion is an operation button for making an open operation of a mechanical lock mechanism when disconnecting a connector of the charging cable locked to the charging inlet located at the vehicle side by the lock mechanism. When the operation button is depressed, the switch turns off in conjunction with the depression, and thus it is impossible to differentiate between the state in which the connector has been actually pulled out of the inlet and the state in which the operation button is being depressed.

In view of this, in the case where the control device at the vehicle side is able to determine that the charging cable is not connected to the vehicle on the basis of output from the connection determination circuit, the control device may determine whether the charging cable is disconnected of the vehicle on the basis of the signal level of the pilot signal.

However, a proper determination cannot be made in the case of a break of a signal line for the pilot signal or in the case a failure of the external power source. Additionally, a proper determination cannot be made in the case where the charging cable is not connected to the external power source. Thus, there is a need for making a detection of state of insertion or disconnection of the charging cable to or off the vehicle, regardless of the signal level of the pilot signal.

SUMMARY OF THE INVENTION

A feature configuration of a control system according to the present invention is as follows. The control system supplies power from a power source outside a vehicle to a power storage device located in the vehicle, and includes: a cable through which the power source outside the vehicle feeds the power storage device; a resistive element located in the vehicle; and a control device located in the vehicle. The cable includes at both ends thereof a power source-side connector for connecting with the power source outside the vehicle and a vehicle-side connector for connecting with the vehicle. The vehicle-side connector includes a signal pin, a series resistive element connected to the signal pin at one end, a switch connected in series to the series resistive element at one end and grounded at the other end, and a parallel resistive element connected in parallel to the switch. The switch changes from an ON state to an OFF state upon depression of a depression portion located on the vehicle-side connector by a user, at a time when the vehicle-side connector is connected to the vehicle, or at a time when the vehicle-side connector is disconnected off the vehicle. The resistive element is electrically connectable to the signal pin at one end and grounded at the other end. The control device determines a state of the control system on the basis of a signal voltage value input from a signal line electrically connectable to the signal pin.

The present invention will become more apparent in the detailed description of the preferred embodiments presented below.

DESCRIPTION OF THE PREFERRED EMBODIMENTS

The following describes a control system, a control device, and a cable connection state determining method according to the present invention.

Figure 1:
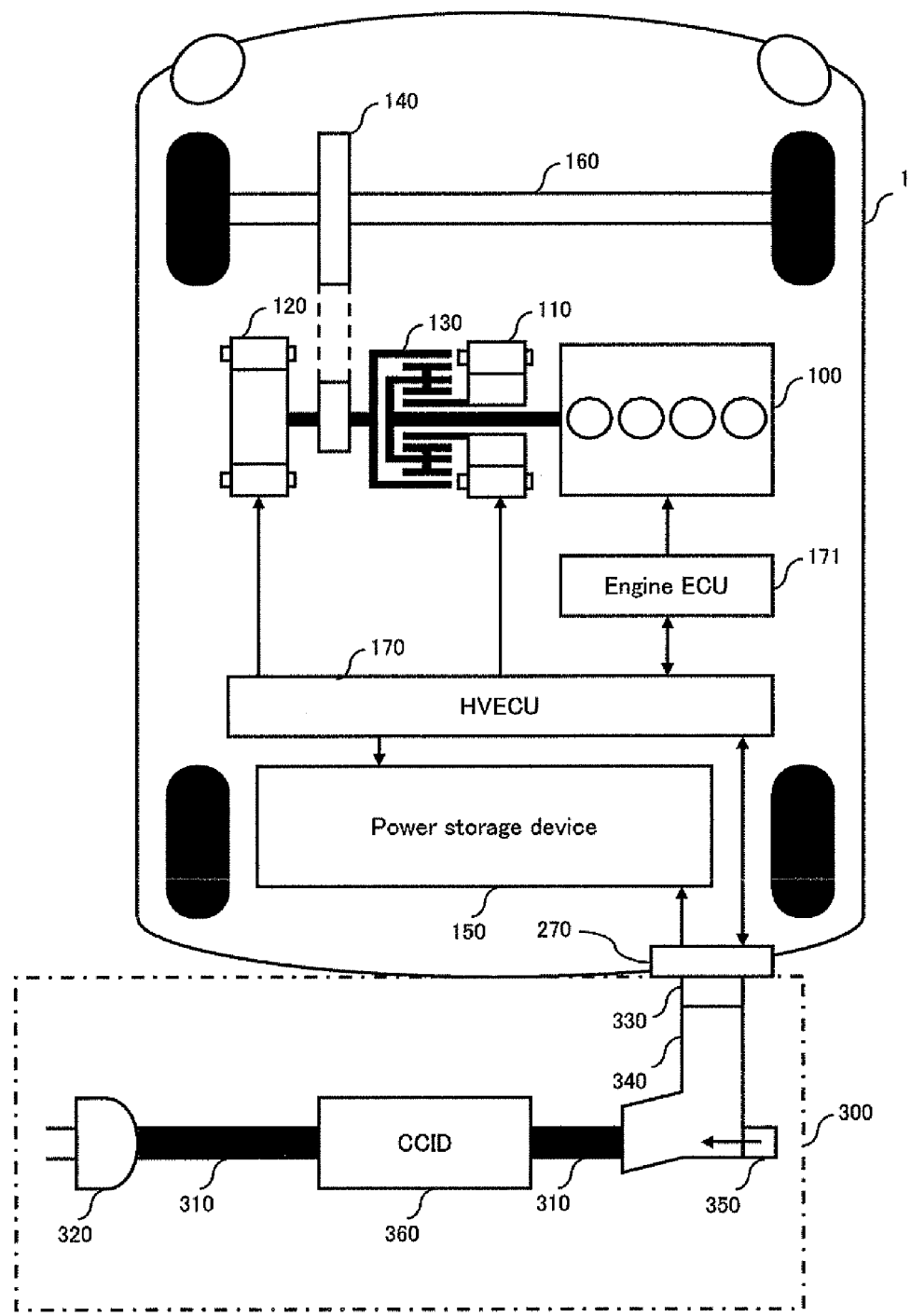
FIG. 1 is a schematic configuration diagram for illustrating a plug-in hybrid vehicle taken as an example of a vehicle to which the present invention is applied.

Referring to FIG. 1, a hybrid vehicle 1 (hereinafter referred to as a plug-in hybrid vehicle), which is an exemplary plug-in vehicle capable of charging an on-board, high-voltage power storage device 150 by a power source outside the vehicle, includes an engine 100 acting as a driving power source, a first MG (motor generator) 110, and a second MG (motor generator) 120.

The plug-in hybrid vehicle 1 has the output shafts of the engine 100, the first motor generator (hereinafter referred to as MG) 110, and the second MG 120 coupled to the power dividing mechanism 130 in order to be able to run on driving power from at least either the engine 100 or the MGs.

The first MG 110 and the second MG 120 each comprise an AC rotating machine, examples including a three-phase AC synchronous motor with a U-phase coil, a V-phase coil, and a W-phase coil.

The power dividing mechanism 130 comprises a planetary gear including a sun gear, a pinion gear, a carrier, and a ring gear, with the pinion gear engaged with the sun gear and the ring gear.

Figure 2:
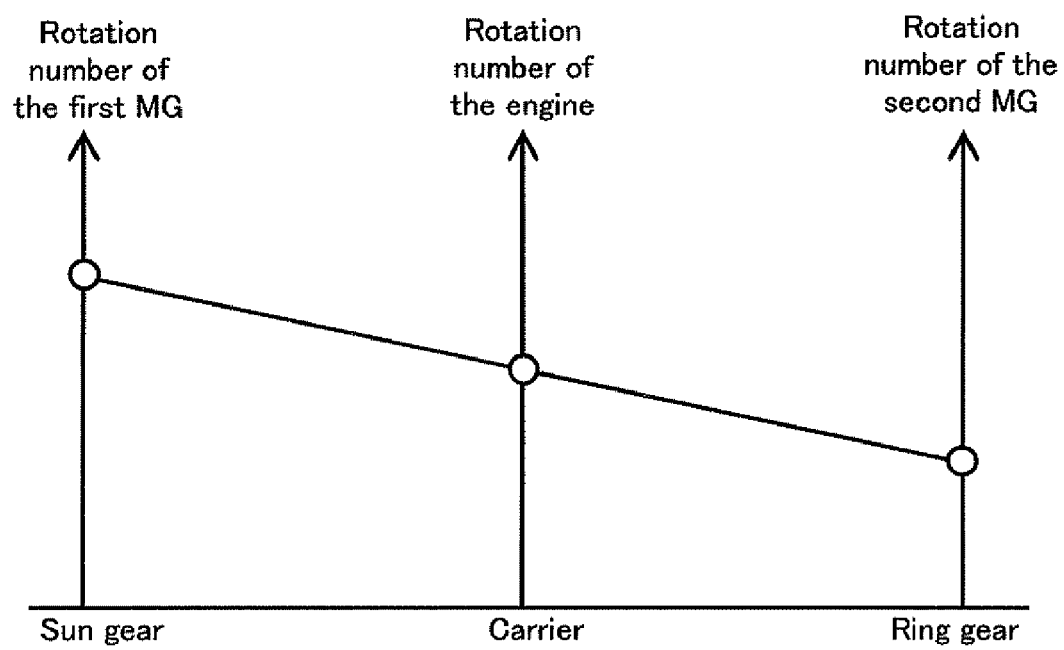
FIG. 2 is an alignment chart for a power dividing mechanism.

The carrier rotatably supports the pinion gear and is coupled to a crank shaft of the engine 100. The sun gear is coupled to a rotational shaft of the first MG 110, and the ring gear is coupled to a rotational shaft of the second MG 120 and to a decelerator 140. The power dividing mechanism 130 makes such a relation that the rotations of the output shafts of the engine 100, the first MG 110, and the second MG 120 are on a linear line in the alignment chart in FIG. 2.

Figure 3:
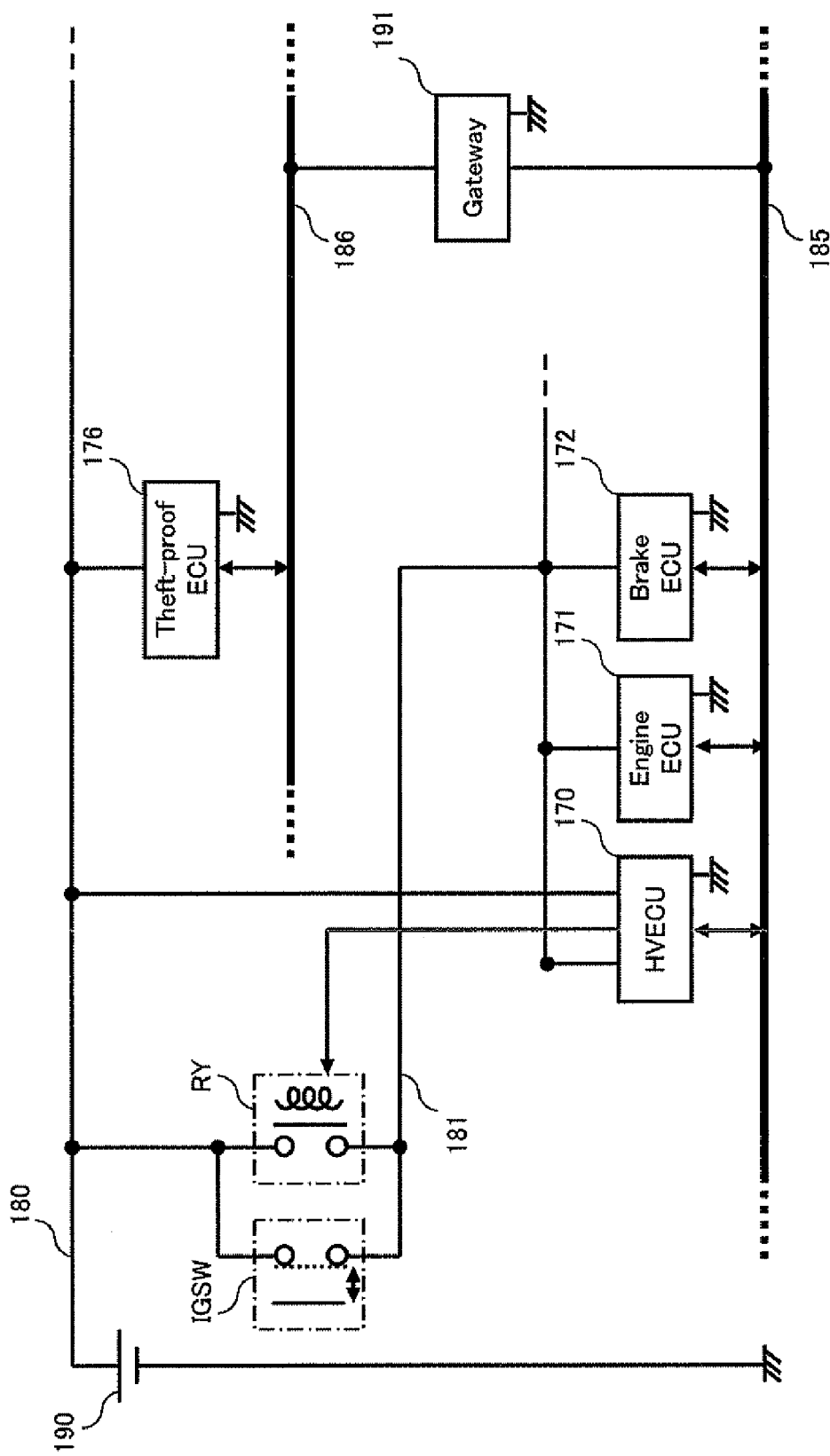
FIG. 3 is a schematic configuration diagram for illustrating an electronic control device mounted in the plug-in hybrid vehicle shown in FIG. 1.

Referring to FIG. 3, the plug-in hybrid vehicle 1 mounts therein a plurality of electronic control units including a hybrid vehicle electronic control unit 170 (electronic control unit will be hereinafter referred to as ECU and hybrid vehicle electronic control unit as HVECU) for assuming general control of the driving power of the vehicle, an engine ECU 171 for controlling the engine, a brake ECU 172 for controlling the brake mechanism, and a theft-proof ECU 176 for implementing a theft-proof function, with each ECU incorporating a single or a plurality of CPUs.

The vehicle includes a first power feeding system 180 and a second power feeding system 181 to which a low-voltage power storage device 190, which is an auxiliary battery, supplies a DC power of, for example, 12V.

The first power feeding system 180 is connected with a body monitoring-related ECU such as the theft-proof ECU 176 and is fed irrespective of the state of an ignition switch IGSW. The second power feeding system 181 is connected with power train-related ECUs such as the HVECU 170, the engine ECU 171, and the brake ECU 172, and with body-related ECUs such as a windshield wiper and a sideview mirror, and is fed when the ignition switch IGSW is in an ON state.

The power train-related ECUs are connected to a CAN (Controller Area Network) bus 185, and the body-related ECUs are connected to an LIN (Local Interconnect Network) bus 186, with the CAN bus 185 and the LIN bus 186 connected to one another through a gateway 191, so that control information necessary for the ECUs can be interchanged.

The ECUs each mount therein a DC regulator for generating a control voltage of a predetermined level (e.g., DC 5V) from the 12V DC voltage supplied from the low-voltage power storage device 190, and the output voltage of the DC regulator is supplied to control circuits such as CPUs.

The HVECU 170 is fed by the first power feeding system 180 as well as by the second power feeding system 181 in order to implement charging control to the power storage device 150 through a charging cable, described later.

The HVECU 170 detects a driver's operation of the ignition switch IGSW and controls the state of feeding from the low-voltage power storage device 190 through the second power feeding system 181.

Specifically, upon detecting an ON operation of the ignition switch IGSW with such a state that a power source relay RY connected in parallel to the ignition switch IGSW is open, the HVECU 170 closes the power source relay RY to start feeding to the second power feeding system 181 from the low-voltage power storage device 190 and maintains this state.

This state causes the ECUs connected to the second power feeding system 181 to be activated and implement respective expected control operations.

Additionally, upon detecting an OFF operation of the ignition switch IGSW with such a state that the power source relay RY is closed, the HVECU 170 transmits to the ECUs an indication that the ignition switch IGSW is turned off through the CAN bus 185 in order to prompt shut-down processing of the ECUs connected to the second power feeding system 181.

The HVECU 170 recognizes completion of the shut-down processing on the basis of data transmitted from the ECUs through the CAN bus 185, and upon completion of the shut-down processing of the HVECU 170 itself, it opens the power source relay RY to discontinue feeding of the second power feeding system 181.

The shut-down processing refers to processing executed upon turning off of the ignition switch IGSW, such as discontinuation processing of various actuators that are in operation and saving processing of control data to memory. For example, for the engine ECU 171, the shut-down processing includes stopping processing of the engine and saving processing of engine-control data that includes various learned data such as air fuel ratio to non-volatile memory.

The ignition switch IGSW may be of the type of either momentary switch or alternate switch. In the case of the momentary switch, the HVECU 170 may hold the current state as flag data in RAM and determine at an operation edge of the switch whether the switch is turned on or off on the basis of the flag data. Alternatively, it is possible to use a rotary switch, which is operated in a rotary manner by inserting a key into a conventional key cylinder.

The HVECU 170 carries out travel control of the vehicle on the basis of an axel operation or other operation by the driver, after the ignition switch IGSW is ON-operated and the power source relay RY is closed.

The HVECU 170 monitors the charging state (hereinafter referred to as SOC (State of Charge)) of the high-voltage power storage device 150 such that for example, upon reduction of SOC below a predetermined value, the HVECU 170 activates the engine 100 through the engine ECU 171 and stores in the power storage device 150 the generated energy of the first MG 110 driven through the power dividing mechanism 130.

Specifically, the power generated at the first MG 110 is converted from AC to DC through an inverter, adjusted at a predetermined charging voltage through a converter, and charged in the power storage device 150. In this regard, part of the driving power that occurred at the engine 100 is transmitted to the driving wheels 160 through the power dividing mechanism 130 and the decelerator 140.

When SOC is within a predetermined range, the HVECU 170 drives the second MG 120 using at least either the power stored in the power storage device 150 or the power generated by the first MG 110, thereby assisting the power of the engine 100. In the meanwhile, the driving power of the second MG 120 is transmitted to the driving wheels 160 through the decelerator 140.

Upon increase of SOC above a predetermined value, the HVECU 170 discontinues the engine 100 through the engine ECU 171 and drives the second MG 120 using the power stored in the power storage device 150.

At the time of braking or the like, the HVECU 170 controls the second MG 120, which is driven by the driving wheels 160 through the decelerator 140, as a power generator, and stores power generated by the second MG 120 in the power storage device 150. That is, the second MG 120 is used as a regenerative brake that converts brake energy into power.

That is, the HVECU 170 controls the engine 100, the first MG 110, and the second MG 120 on the basis of a desired torque of the vehicle, SOC of the power storage device 150, and the like.

While in FIG. 1 the driving wheels 160 are front wheels, the rear wheels may be the driving wheels 160, or both the front and rear wheels may be the driving wheels 160.

The high-voltage power storage device 150 is a chargeable-dischargeable DC power source and comprises, for example, a secondary battery such as of nickel hydrogen and lithium ion. The voltage of the power storage device 150 is approximately 200 V, for example. The power storage device 150 is chargeable by power supplied from power sources outside the vehicle, as well as the power generated by the first MG 110 and the second MG 120.

As the power storage device 150, it is also possible to employ a capacitor of large capacitance. There are no limitations to the configuration of the power storage device 150 insofar as it is a power buffers that can temporality store the power generated by the first MG 110 and the second MG 120 and the power from power sources outside the vehicle and supply the stored power to the second MG 120.

Figure 4:
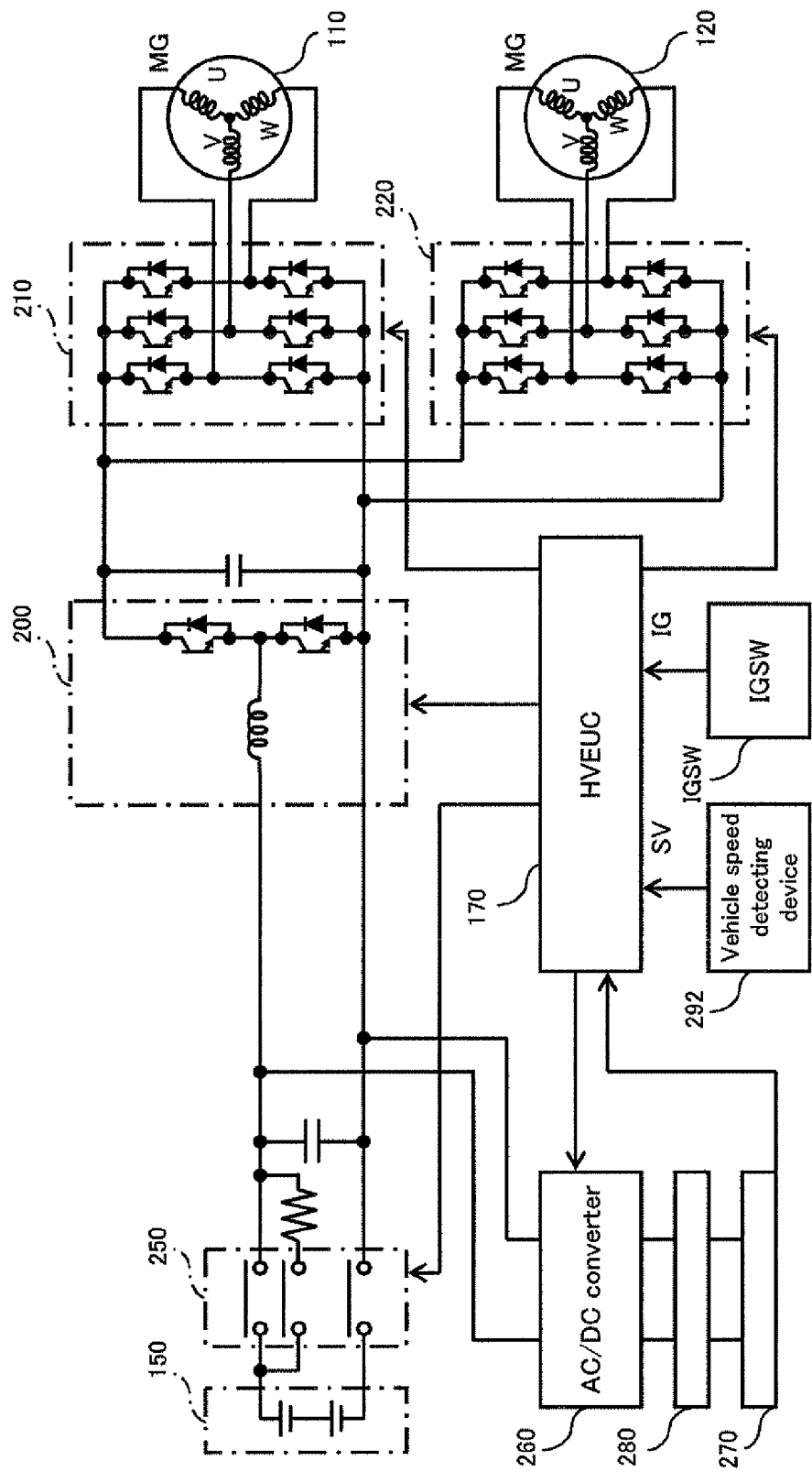
FIG. 4 is an outline configuration diagram for illustrating an electronic control device and a controlled device in relation to charging control of a power storage device.

Referring to FIG. 4, the high-voltage power storage device 150 is connected to, through a system main relay 250, a converter 200 that adjusts power at a predetermined DC voltage, and the output voltage of the converter 200 is converted to AC voltage at a first inverter 210 and a second inverter 220. Then the converted voltage is applied to the first MG 110 and the second MG 120.

The converter 200 includes a reactor, two npn transistors acting as power switching elements, and two diodes. The reactor is connected at one end to the positive electrode side of the power storage device 150 and connected at the other end to the node of the two npn transistors. The two npn transistors are connected to one another in series and the diodes are connected to the npn transistors in antiparallel.

As the npn transistors, IGBTs (insulated gate bipolar transistors), for example, may be conveniently used. Instead of the npn transistors, power switching elements may be used such as power MOSFETs (Metal Oxide Semiconductor Field-Effect Transistors).

The first inverter 210 includes a U-phased arm, a V-phased arm, and a W-phased arm, which are connected each other in parallel. Each phased arm includes two npn transistors connected to one another in series and two diodes connected to the npn transistors in antiparallel. The node of the two npn transistors of each phased arm is connected to a corresponding coil end of the first MG 110.

The first inverter 210 converts DC power supplied from the converter 200 into AC power and supplies the converted power to the first MG 110, or converts AC power generated by the first MG 110 to DC power and supplies the converted power to the converter 200.

The second inverter 220 is configured similarly to the first inverter 210. The node of the two npn transistors of each phased arm is connected to a corresponding coil end of the second MG 120.

The second inverter 220 converts DC power supplied from the converter 200 into AC power and supplies the converted power to the second MG 120, or converts AC power generated by the second MG 120 into DC power and supplies the converted power to the converter 200.

Upon ON-operation of the ignition switch IGSW, the HVECU 170 closes the system main relay 250. Then the HVECU 170 controls, for example, the power switching elements of the converter 200 on the basis of the axel operation or other operation by the driver to raise the output voltage of the power storage device 150 to a predetermined level; controls the phased arms of the second inverter 220 to drive the second MG 120; and controls, for example, the phased arms of the first inverter 210 to convert the generated power from the first MG 110 to DC power and raises the voltage of the converted power at the converter 200, thereby charging the power storage device 150.

Referring to FIGS. 1 and 4, the plug-in hybrid vehicle 1 includes a charging inlet 270 for connecting a charging cable 300 that supplies charged power from a power source outside the vehicle to the power storage device 150. While in FIG. 1 the charging inlet 270 is located in the rear of the vehicle body, the charging inlet 270 may be located in the front of the vehicle body.

AC power from the charging cable 300 connected to the charging inlet 270 is input to, through an LC filter 280, an AC/DC converter 260 that acts as a charging circuit, and converted to DC power by the AC/DC converter 260, and then the high-voltage power storage device 150 is charged.

The charging cable 300 includes, at one end of a power cable 310, a plug 320 for connecting to an external power source, e.g., a power source receptacle provided in a residential house, and at the other end of the power cable 310, an attachment 340 that includes a connector 330 for connecting to the charging inlet 270.

The plug 320 acts as a first connector, the connector 330 acts as a second connector, and the charging inlet 270 acts as a third connector, which is located at the vehicle side.

Figure 5:
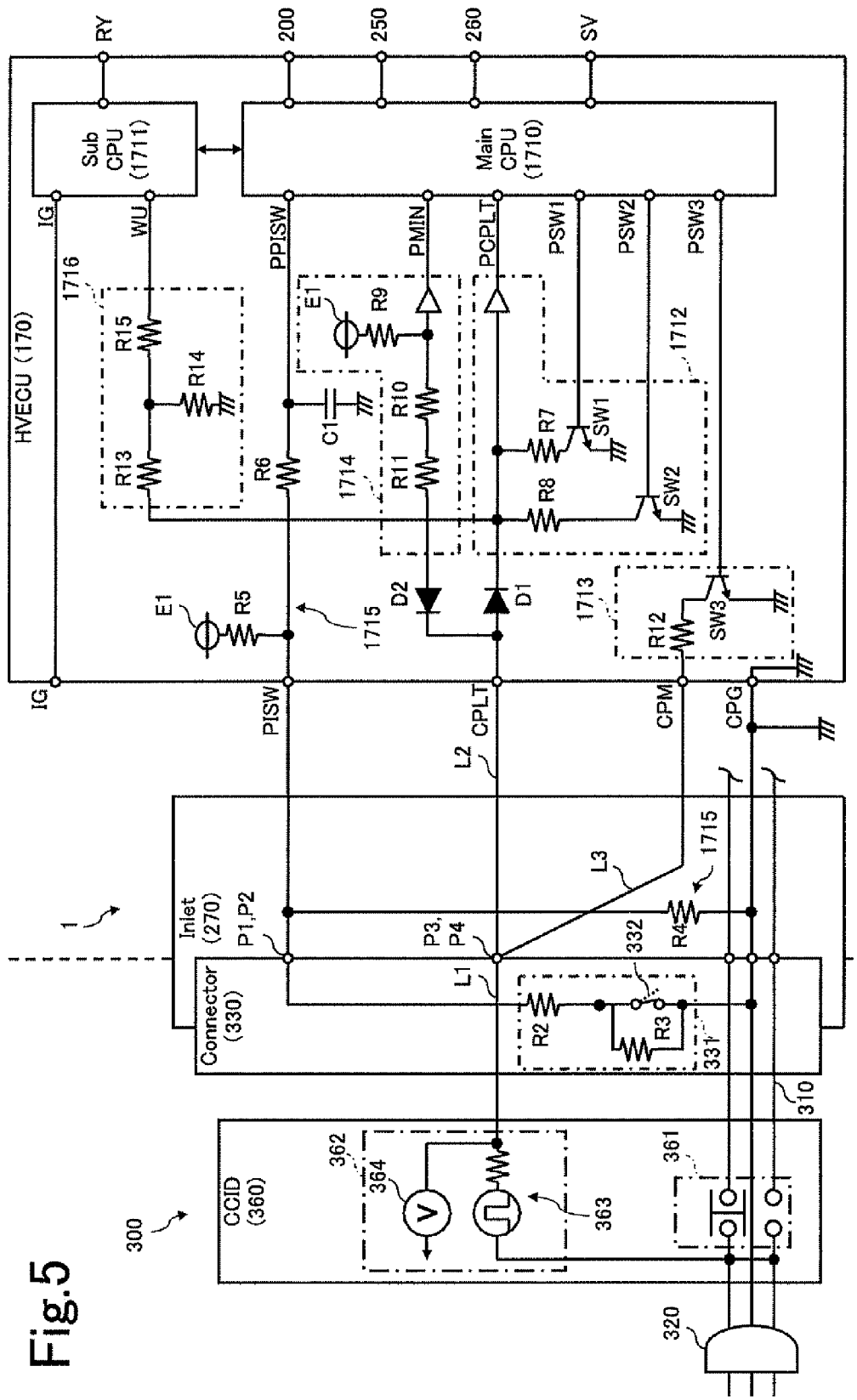
FIG. 5 is a detailed circuit diagram for illustrating the electronic control device in relation to charging control of the power storage device shown in FIG. 4.

Referring to FIGS. 1 and 5, the charging cable 300 includes a signal generating portion 362 and a CCID (Charging Circuit Interrupt Device) 360 that incorporates a relay 361 for interrupting the power cable 310.

The signal generating portion 362 generates a pulse signal (hereinafter referred to as control pilot signal or CPLT signal) that corresponds to a rated current feedable to the vehicle through the power cable 310.

For this purpose, the signal generating portion 362 includes CPU, ROM, and RAM that operate by power supplied from the external power source, and a peripheral circuit that includes an oscillating portion 363 for generating a control pilot signal and a voltage detecting portion 364 for detecting the signal level of the control pilot signal.

The connector 330 incorporates a connection determining circuit 331 that includes a switch 332 grounded at one end and connected at the other end to a resistor R2 in series, and a resistor R3 connected in parallel to the switch 332. Connecting the connector 330 to the charging inlet 270 causes the output of the connection determining circuit 331 to be input to the HVECU 170 as a cable connection signal PISW. The resistor R2 acts as a first resistive element and the resistor R3 acts as a second resistive element.

The attachment 340 includes a mechanical lock mechanism to prevent disconnection of the connector 330 inserted into the charging inlet 270, and an operation portion 350 comprising an operation button for releasing the lock mechanism.

The connector 330 can be disconnected off the charging inlet 270 by depressing the operation button in order to release the lock mechanism with such a state that the connector 330 is attached to the charging inlet 270. In conjunction with the depression of the operation button, the switch 332 of the connection determining circuit 331 shifts to an open state, while upon release of the depression, the switch 332 returns to a closed state.

Referring to FIG. 5, the connector 330 of the charging cable 300 includes a pair of power terminal pins connected to the power cable 310, a ground terminal pin, a terminal pin (first signal pin) P1 of the connection determining circuit 331, and a terminal pin (third signal pin) P3 of a control line L1 for outputting a control pilot signal.

The charging inlet 270 includes a plurality of terminal pins electrically connected to corresponding terminal pins of the connector 330, and a break detecting terminal pin. The plurality of terminal pins include a terminal pin (second signal pin) P2 electrically connectable to the terminal pin (first signal pin) P1 of the connection determining circuit 331, and a terminal pin (fourth signal pin) P4 electrically connectable to the terminal pin (third signal pin) P3 of the control line L1.

The break detecting terminal pin is a terminal pin connected to a control line L3 that detects a break of a vehicle-side control line L2, which transmits the control pilot signal, and is shared with the terminal pin (fourth signal pin) P4, which is electrically connectable to the terminal pin (third signal pin) P3 of the control line L1.

Additionally, between the terminal pin of the connection determining circuit 331 and the ground, the charging inlet 270 includes a resistor R4 connected in parallel to the connection determining circuit 331.

Referring to FIG. 5, the HVECU 170 includes a sub CPU 1711 that is for charging activation control and fed by the first power feeding system 180, and a main CPU 1710 that is for charging control and fed by the second power feeding system 181.

Each of the CPUs includes ROM that stores a control program and control data, and the main CPU 1710 includes RAM used as a working area and a nonvolatile memory in which the control data is saved when the power is off. The RAM includes a DMA controller so as to be readable and writable by the sub CPU 1711 as well.

The HVECU 170 includes, as peripheral circuits of the main CPU 1710, a first interface circuit 1712, a second interface circuit 1714, a break detecting circuit 1713, and a connection state distinguishing circuit 1715.

The first interface circuit 1712 is a circuit that detects the signal level of the control pilot signal output from the charging inlet 270 and changes the signal level between two phase shifts.

The second interface circuit 1714 is a circuit that detects the low level of the control pilot signal. When a failure occurs in the CCID 360, the control pilot signal is maintained at −12V, and thus whether the CCID 360 has a failure is determined on the basis of the signal level of the control pilot signal input through the second interface circuit 1714.

The break detecting circuit 1713 includes a switch SW3 comprising a transistor that is connected at its collector in series to a resistor R12 connected to the terminal pin for break detection and that is grounded at the emitter of the switch SW3, The break detecting circuit 1713 is a circuit that detects a break of the control line L2 at the vehicle side.

The connection state distinguishing circuit 1715 is a resistive potential dividing circuit that includes a resistor R4 connected in parallel to the connection determining circuit 331, and a resistor R5 connected at one end to this parallel circuit (of the resistor R4 and the connection determining circuit 331) and connected at the other end to a power source E1 (of DC 5V in this embodiment) at the vehicle side. The resistor R4 acts as a third resistive element, and the resistor R5 acts as a fourth resistive element.

The first interface circuit 1712 includes a first step-down circuit comprising a resistor R7 and a switch SW1 and a second step-down circuit comprising a resistor R8 and a switch SW2, and is used to reduce the signal level of the control pilot signal input through a diode D1.

The second interface circuit 1714 includes a resistive circuit (R9, R10, R11) and a buffer circuit, with the resistor R9 pulled up to the power source voltage of the power source E1 (of DC 5V in this embodiment). The second interface circuit 1714 is an interface circuit that inputs a low level signal to the main CPU 1710 when the signal level of the control pilot signal input through a diode D2 turns into a negative level, while inputting a high level signal to the main CPU 1710 when the signal level of the control pilot signal input through the diode D2 turns into a positive level.

Additionally, the HVECU 170 includes, as a peripheral circuit of the sub CPU 1711, an edge detecting circuit 1716 comprising resistors R13, R14, and R15 that detect a rising edge of the control pilot signal, with the output of the edge detecting circuit 1716 connected to an interruption terminal WU for waking up the sub CPU 1711.

Upon turning off of the ignition switch IGSW, the main CPU 1710 ends the shut-down processing and turns off the power source relay RY, and the sub CPU 1711 shifts to a stand-by state, which is a low power consumption mode. The stand-by state refers to such a state that CPU has executed a stop instruction or a hold instruction.

Upon input of an ignition switch IGSW signal to an interruption terminal IG of the sub CPU 1711 while the sub CPU 1711 is shifted to the stand-by state, the sub CPU 1711 returns (wakes up) from the stand-by state to a normal operation state.

Then the sub CPU 1711 closes the power source relay RY and feeds the main CPU 1710 to start up the main CPU 1710, and then outputs to the main CPU 1710 a signal indicating a normal mode, in which the ignition switch IGSW is on.

With such a state that the ignition switch IGSW is on, the main CPU 1710 controls the engine 100, the first MG 110, and the second MG 120 on the basis of a desired torque of the vehicle, SOC of the power storage device 150, and the like.

Upon determining that the charging cable 300 is not connected on the basis of input from the connection state distinguishing circuit 1715, the main CPU 1710 turns on the switch SW3 of the break detecting circuit 1713 and grounds the break detecting terminal pin through the resistor R12.

On the basis of the level of a control pilot signal input through the first interface circuit 1712 on this occasion, the main CPU 1710 determines whether the control line L2 at the vehicle side has a break thereon.

When the control line L2 is normal, the potential is reduced to ground level by a pull-down resistor R14 of the edge detecting circuit 1716, while when the control line L2 has a break thereon, the potential is maintained at a level higher than ground level by voltage division of current passing through a pathway starting from the resistor R9, which is pulled up to the voltage of the control power source, the resistor R10, the resistor R11, the diode D2, the diode D1, the resistor R13, and the resistor R14.

Thus, when, with such a state that the switch SW3 is on, the level of the control pilot signal input to the main CPU 1710 is at low level, the main CPU 1710 determines that the control line L2 is normal, while in the case of a high level, the main CPU 1710 determines that the control line L2 has a break thereon.

The following describes in detail the charging control by the HVECU 170 of charging the power storage device 150 through the charging cable 300.

Figure 6:
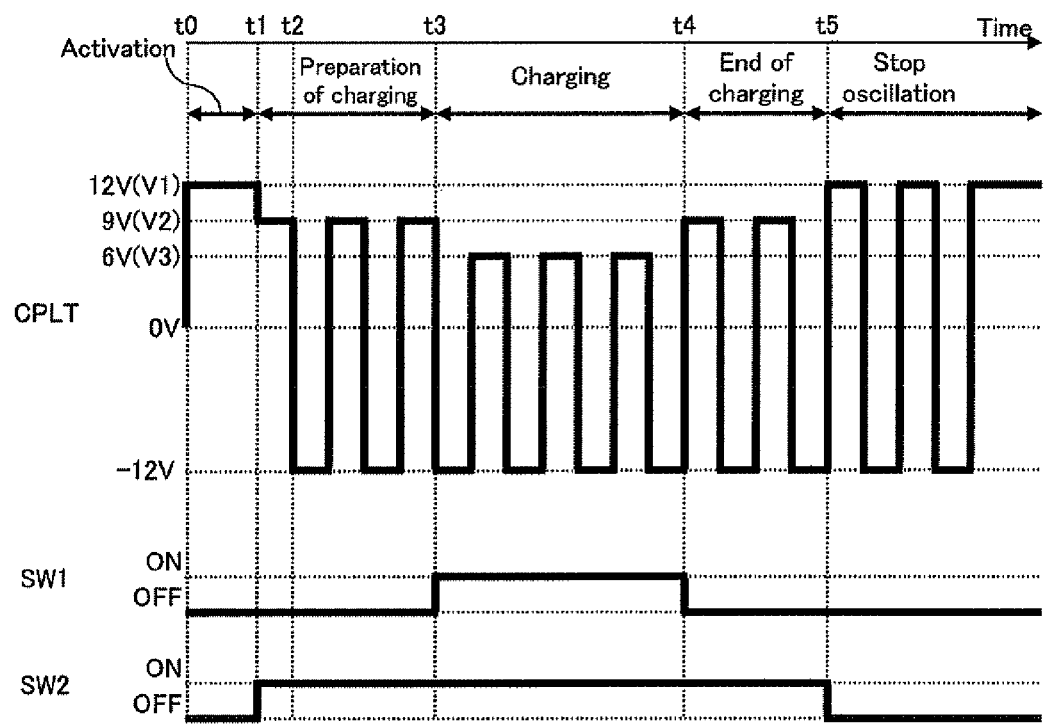
FIG. 6 is a timing chart for describing switching of a pilot signal and a first interface circuit in relation to charging control of the power storage device.

Referring to FIG. 6, with the ignition switch IGSW off and the sub CPU 1711 shifted to a stand-by state, upon connection of the plug 320 to the receptacle of an external power source at time 0 and upon mounting of the charging cable 300 to the charging inlet 270, the signal generating portion 362 outputs a control pilot signal of a predetermined level (e.g., +12V) of DC voltage V1.

Upon input of a rising edge signal of the control pilot signal to the interruption terminal WU of the sub CPU 1711, the sub CPU 1711 returns from the stand-by state to the normal operation state, closes the power source relay RY to start up the main CPU 1710, and outputs a signal indicating a charging mode to the main CPU 1710.

Upon receipt of the signal indicating the charging mode from the sub CPU 1711 and detecting through the first interface circuit 1712 at time 1 a DC voltage V1 input to an A/D conversion input terminal PCPLT, the main CPU 1710 turns on the switch SW2 of the second step-down circuit to reduce the voltage level of the control pilot signal from V1 to V2 (e.g., +9V).

Upon detecting at the voltage detecting portion 364 that the control pilot signal has reduced from V1 to V2, the signal generating portion 362 at time 2 generates and outputs from the oscillating portion 363 a pulse signal of a predetermined frequency (e.g., 1 KHz) at a predetermined duty cycle. The signal level of the pulse signal is ±V1, but its upper limit level is reduced to V2 by the second step-down circuit.

Figure 7A:
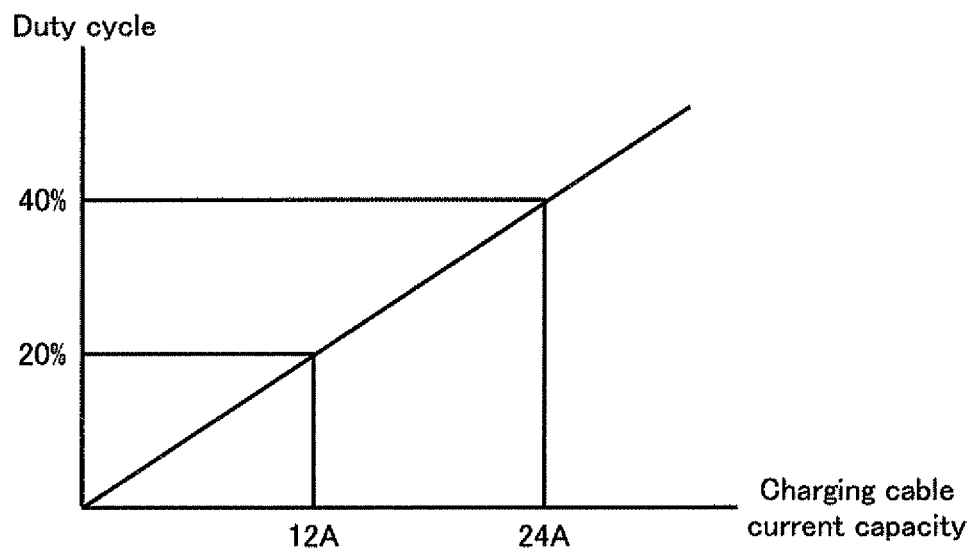
FIG. 7A is a diagram of a duty cycle of a pilot signal, illustrating a current capacity of a charging cable.
Figure 7B:
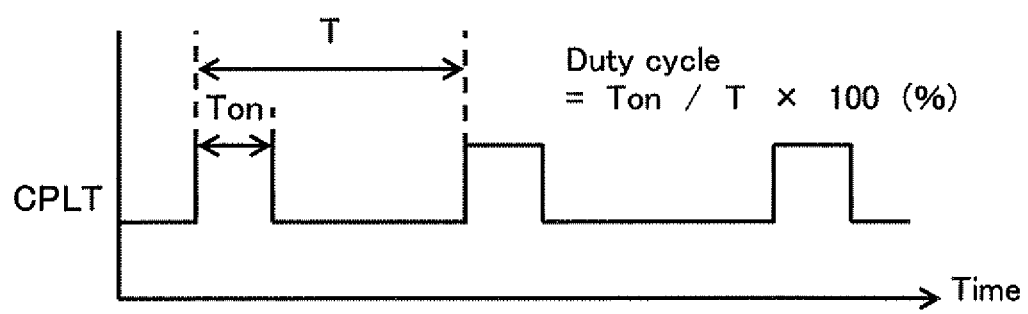
FIG. 7B is a waveform diagram for illustrating a pilot signal generated at a signal generating portion.

Referring to FIGS. 7A and 7B, the duty cycle is set in advance on a charging cable basis while at the same time being set on the basis of a capacity of current that can be supplied to the vehicle through the charging cable 300 from the external power source. For example, the duty ratio is set at 20% when the current capacity is 12 A, and at 40% when the current capacity is 24 A.

Referring back to FIG. 6, upon detecting the duty cycle of the pulse signal through the second interface circuit 1714 and recognizing the current capacity of the charging cable 300, the main CPU 1710 at time 3 closes the system main relay 250 (see FIG. 4) and turns on the switch SW1 of the first step-down circuit with such a state that the switch SW2 of the second step-down circuit is on, thereby reducing the voltage level of the control pilot signal from V2 to V3 (e.g., +6V).

Upon detecting that the voltage level of the control pilot signal has reduced from V2 to V3, the signal generating portion 362 closes the relay 361 to supply AC power to the vehicle side through the power cable 310.

Then the main CPU 1710 controls the AC/DC converter 260, which is a charging circuit (see FIG. 4), to carry out charging control of the power storage device 150.

Upon detecting at time 4 that SOC of the power storage device 150 has reached a predetermined level, the main CPU 1710 discontinues the AC/DC converter 260 to end the charging, and releases the system main relay 250 (see FIG. 4). Then the main CPU 1710 turns off the switch SW1 of the first step-down circuit to raise the voltage level of the control pilot signal from V3 to V2.

Upon detecting that the voltage level of the control pilot signal has raised from V3 to V2, the signal generating portion 362 releases the relay 361 to discontinue the supply of AC power to the vehicle side through the power cable 310.

At time 5, the main CPU 1710 turns off the switch SW2 of the second step-down circuit to bring the level of the control pilot signal back to the initial V1, and then starts shut-down processing upon stopping of the oscillation from the signal generating portion 362.

Upon receipt of a signal indicating the end of the charging control from the main CPU 1710, the sub CPU 1711 releases the power source relay RY and then turns into a stand-by state.

Interruption of the charging control must be done appropriately because if the charging cable 300 is pulled out of the charging inlet 270 during the charging control, there is a possibility of terminal degradation due to spark discharge.

Additionally, if the ignition switch IGSW is turned on after the charging with such a state that the charging cable 300 is mounted to the charging inlet 270, there is a possibility that the vehicle might start with the charging cable 300 on.

Additionally, if the ignition switch IGSW is turned on during the charging and the operation portion 350 located in the attachment 340 of the charging cable 300 is depressed, the main CPU 1710 might determine that the charging cable 300 has been pulled out, and if the switch SW3 of the break detecting circuit 1713 is turned on, the signal level of the control pilot signal might reduce, resulting in a possibility of mal-operation of the signal generating portion 362 located in the CCID 360.

In view of these possibilities, as described above, the present invention employs the connection state distinguishing circuit 1715, which is connectable to the output terminal of the connection determining circuit 331, so that on the basis of the output value of the connection state distinguishing circuit 1715, the main CPU 1710 is able to differentiate between an OFF operation of the switch 332 based on handling of the operation portion 350 and disconnection of the charging cable 300 off the vehicle.

Figure 8A:
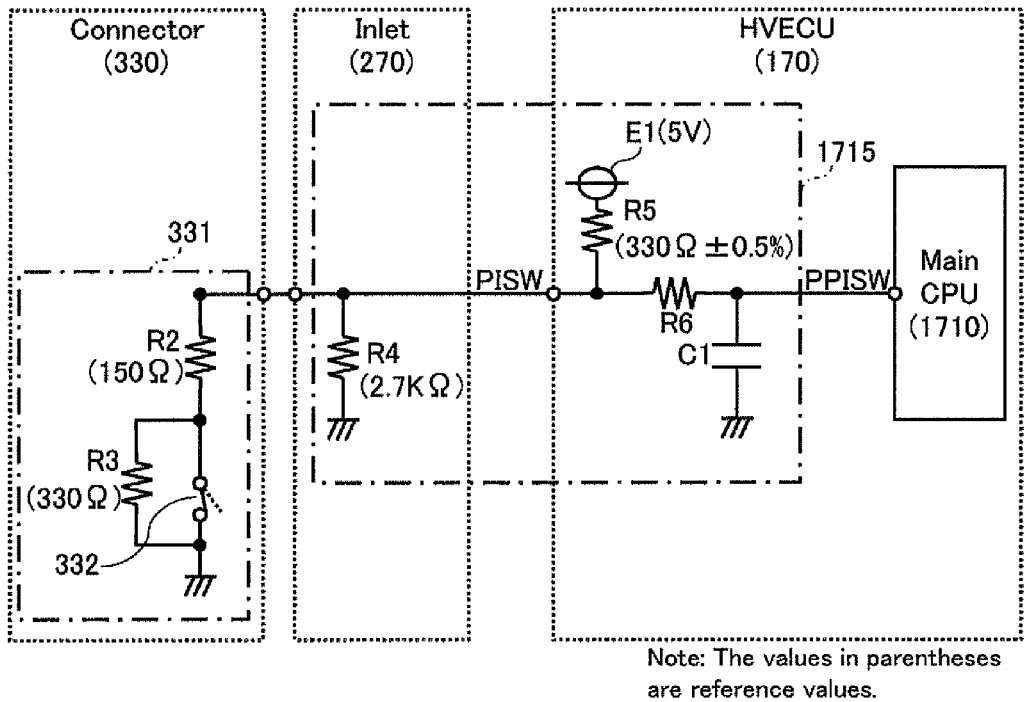
FIG. 8A is a diagram for illustrating a circuit for measuring a terminal voltage of a connection state distinguishing circuit.

Referring to FIG. 8A, in the connection state distinguishing circuit 1715, the resistor R5 (fourth resistive element) connected at one end to the power source E1 of DC8V and the resistor 114 (third resistive element) grounded at one end are connected to one another in series, and the node of the resistors R4 and R5 is connected to a cable connection signal PISW terminal of the connection determining circuit 331.

The node is connected to an A/D conversion input terminal PPISW of the main CPU 1710 through a resistor 116 and a capacitor C1. The resistor 116 is a resistor for protection, and the capacitor C1 is connected for noise absorption. The reference voltage of the A/D conversion input terminal is set at DC 5V.

Figure 8B:
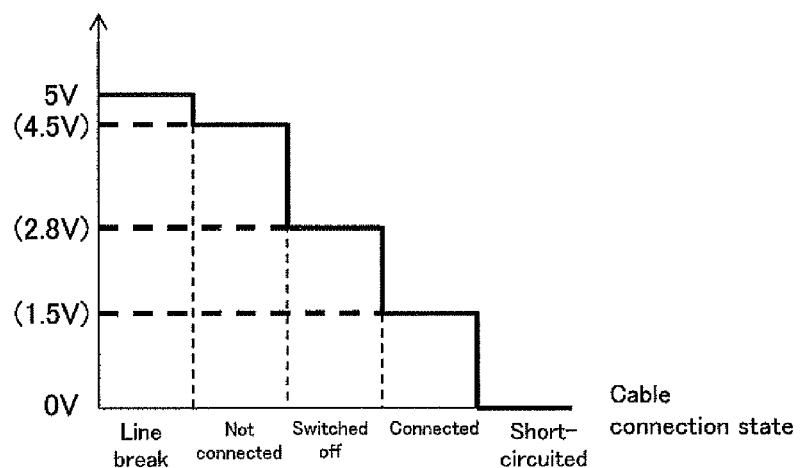
FIG. 8B is a diagram for illustrating a relation between the terminal voltage of the connection state distinguishing circuit and a charging cable connection state.

Referring to FIG. 8B, the voltage level of the node of the resistors R4 and R5 is at the same potential as the voltage of the power source E1 when there is a break along the wiring between the charging inlet 270 and the HVECU 170, and at ground potential when the wiring between the charging inlet 270 and the HVECU 170 is short-circuited to the earth.

Additionally, the voltage level of the node of the resistors R4 and R5 varies between the power source potential and the ground potential in order to individually deal with the states in which: the charging cable 300 is not connected to the vehicle; the charging cable 300 is connected to the vehicle and the switch 332 is turned off by depression of the operation portion 350; and the charging cable 300 is connected to the vehicle and the operation portion 350 is not depressed to keep the switch 332 on.

In order to identify the states individually, the values of the resistors R2, R3, R4, and R5 are set, and respective voltage levels are stored in ROM.

For example, as shown with parentheses in FIG. 8A, the resistor R2 is set at 150Ω, the resistor R3 is set at 330Ω, the resistor R4 is set at 2.7 KΩ, and the resistor R5 is set at 330Ω±0.5%.

Specifically, referring to FIG. 8A, in the state in which the charging cable 300 is not connected to the vehicle, a divided voltage level of the resistors R4 and R5 is input. For example, in the case of applying the resistance values shown in FIG. 8A, voltage division is carried out with the resistor R4 of 2.7 KΩ resistance and the resistor R5 of 330Ω±0.5% resistance, resulting in input of approximately 4.5V voltage.

In the state in which the charging cable 300 is connected to the vehicle and the switch 332 is turned off by depression of the operation portion 350, a divided voltage level of the resistor R5 and a synthesized resistance of the resistors R2, R3, and R4 is input. For example, in the case of applying the resistance values shown in FIG. 8A, the resistance value of the synthesized resistance of the resistors R2, R3, and R4 is approximately 408Ω, which is used for voltage division with the resistor R5 of 330Ω±0.5% resistance, resulting in input of approximately 2.8V voltage.

In the state in which the charging cable 300 is connected to the vehicle and the operation portion 350 is not depressed to keep the switch 332 on, a divided voltage level of the resistor R5 and a synthesized resistance of the resistors R2 and R4 is input. For example, in the case of applying the resistance values shown in FIG. 8A, the resistance value of the synthesized resistance of the resistors R2 and R4 is approximately 142Ω, which is used for voltage division with the resistor R5 of 330Ω±0.5% resistance, resulting in input of approximately 1.5V voltage.

Thus, the main CPU 1710 is able to accurately determine the connection state of the charging cable 300, the operation state of the operation portion 350, and the like on the basis of the voltage values stored in advance in ROM and the output value of the connection state distinguishing circuit 1715, irrespective of the state of the control pilot signal, the power failure state of the external power source connected to the charging cable 300, and the connection state of the plug of the charging cable 300 to the external power source. Thus, the main CPU 1710 is able to carry out appropriate control according to each of the states.

For example, when the charging cable 300 is in a connected state, the main CPU 1710 avoids starting of the vehicle and avoids the ON operation of the switch SW3 of the break detecting circuit 1713. When the operation portion 350 is in an operated state, the main CPU 1710 interrupts the charging control, and in a line-break state or a short-circuited state, displays a failure indication on the display portion of the vehicle.

The interruption of the charging control refers to a series of processing carried out by the main CPU 1710 upon determining between the time 1 and the time 4 shown in FIG. 6 that the operation portion 350 has been operated, the processing including: releasing the system main relay 250 (see FIG. 4); turning off the switch SW1 of the first step-down circuit; raising the voltage level from V3 to V2; turning off the switch SW2 of the second step-down circuit; and bringing the level of the control pilot signal back to the initial V1.

Upon determining during the interruption of the charging control that the operation of the operation portion 350 has been released, the main CPU 1710 resumes the charging control by repeating the processing that starts from the time 1 shown in FIG. 6.

For example, upon detecting that the charging cable 300 is disconnected off the vehicle when the ignition switch IGSW is ON-operated during the charging control, the main CPU 1710 may turn on the switch SW3 of the break detecting circuit 1713 to carry out break detection of the control line L2 of the control pilot signal.

Additionally, when the control pilot signal is not output while the charging cable 300 is in a connected state, the main CPU 1710 may have a function as an alarm portion that determines that the plug 320 of the charging cable 300 is not connected to the receptacle or that the external power source is having a power failure, and displays an alarm indication on the display portion informing the determination.

That is, the electronic control device according to the present invention is implemented by the HVECU 170. The HVECU 170 acts as a control portion that, when the charging cable 300 is connected to the vehicle by the main CPU 1710 and its peripheral circuits, detects a pulse signal through the control lines L1 and L2, which are connected to the output terminal of the signal generating portion 362, and charges the power storage device 150 on the basis of the pulse signal.

Then on the basis of the output value of the connection state distinguishing circuit 1715, the HVECU 170 distinguishes whether the switch 332 is OFF-operated on the basis of the operation of the operation portion 350 or the charging cable 300 is disconnected off the vehicle.

Another embodiment will be described below. While in the above embodiment the connection state distinguishing circuit 1715 is configured such that the resistor R5 connected at one end to the power source E1 of DC5V and the resistor R4 grounded at one end are connected to one another in series, with the node of the resistors R4 and R5 connected to the cable connection signal PISW of the connection determining circuit 331, the specific configuration of the connection state distinguishing circuit 1715 will not be limited to such circuit.

Figure 9A:
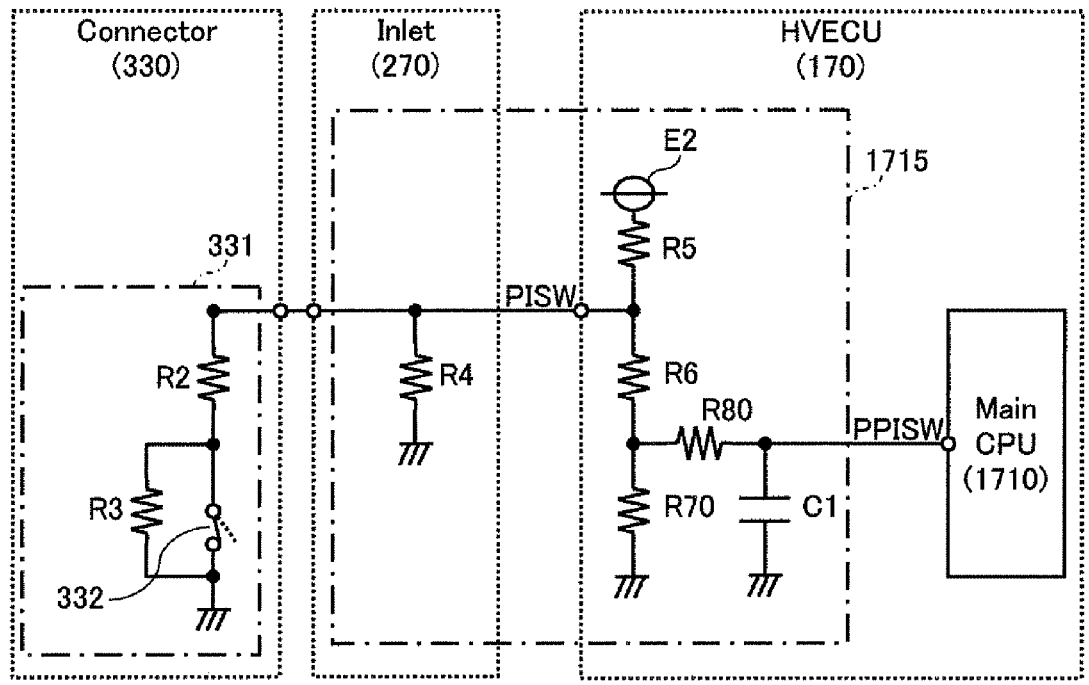
FIG. 9A is a diagram for illustrating a circuit for measuring a terminal voltage of a connection state distinguishing circuit in another embodiment.

For example, referring to FIG. 9A, the connection state distinguishing circuit 1715 may be configured such that a resistor R5 connected at one end to a power source E2 (DC12V) that is fed from the low-voltage power storage device 190 is directly connected to a series-parallel resistor circuit (composed of resistors R4, R6, and R70) grounded at one end, with the node of the series-parallel resistor circuit and the resistor R5 connected to the cable connection signal PISW terminal of the connection determining circuit 331 and the node of the resistors R6 and R70 connected to the A/D conversion input terminal PPISW of the main CPU 1710 through a resistor R80 and the capacitor C1. The resistor R80 is a resistor for protection, and the capacitor C1 is connected for noise absorption.

Also in this case, the values of the resistors R2, R3, R4, R5, R6, and R70 may be set to secure that the voltage level of the node of the series-parallel resistor circuit and the resistor R5 can be distinguished between the potential of the power source E2 and ground potential in order to individually deal with the states in which: the charging cable 300 is not connected to the vehicle; the charging cable 300 is connected to the vehicle and the switch 332 is turned off by depression of the operation portion 350; and the charging cable 300 is connected to the vehicle and the operation portion 350 is not depressed to keep the switch 332 on.

Figure 9B:
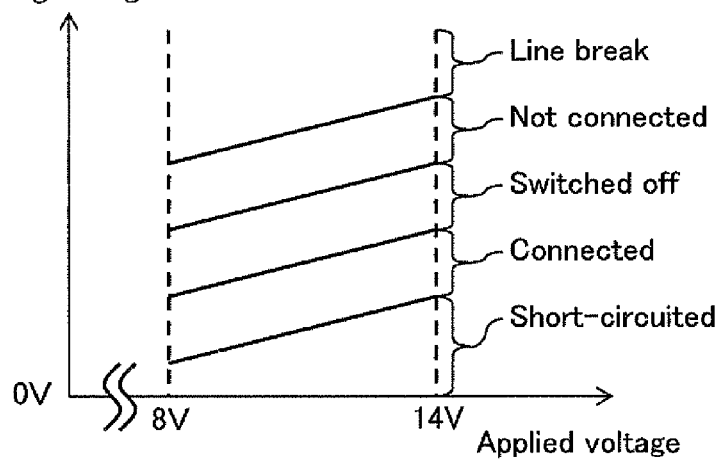
FIG. 9B is a diagram for illustrating a relation between the terminal voltage of the connection state distinguishing circuit shown in FIG. 9A and a power source voltage of the connection state distinguishing circuit, and a relation between the terminal voltage and a charging cable connection state.

Additionally, in the event that the power source voltage of the low-voltage power storage device 190 fluctuates between approximately DC8V and DC14V, in order to secure an accurate state determination considering the fluctuation, ROM of the main CPU 1710 may store a map that sets threshold voltages for the states to correspond to the fluctuation of the power source voltage of the low-voltage power storage device 190, as shown in FIG. 9B.

It should be noted that in the connection state distinguishing circuit 1715 in the above case, the power source voltage is reduced by the resistors R5, R6, and R70 so that the maximum value of the voltage input to the A/D conversion input terminal PPISW becomes equal to or lower than a reference voltage for A/D conversion.

The main CPU 1710 is capable of accurately distinguishing each of the states by monitoring the power source voltage of the low-voltage power storage device 190, reading from the map a threshold voltage corresponding to the monitored power source voltage, and comparing the threshold voltage read from the map with the output voltage of the connection state distinguishing circuit 1715.

While in the above embodiment the connection determining circuit 331 connected to the connection state distinguishing circuit 1715 is configured such that the resistor 113 is connected in parallel to the switch 332, the connection determining circuit 331 may include, instead of the resistor R3, a timer circuit that OFF-operates the switch 332 for a predetermined period of time in conjunction with the operation of the operation portion 350.

Figure 10:
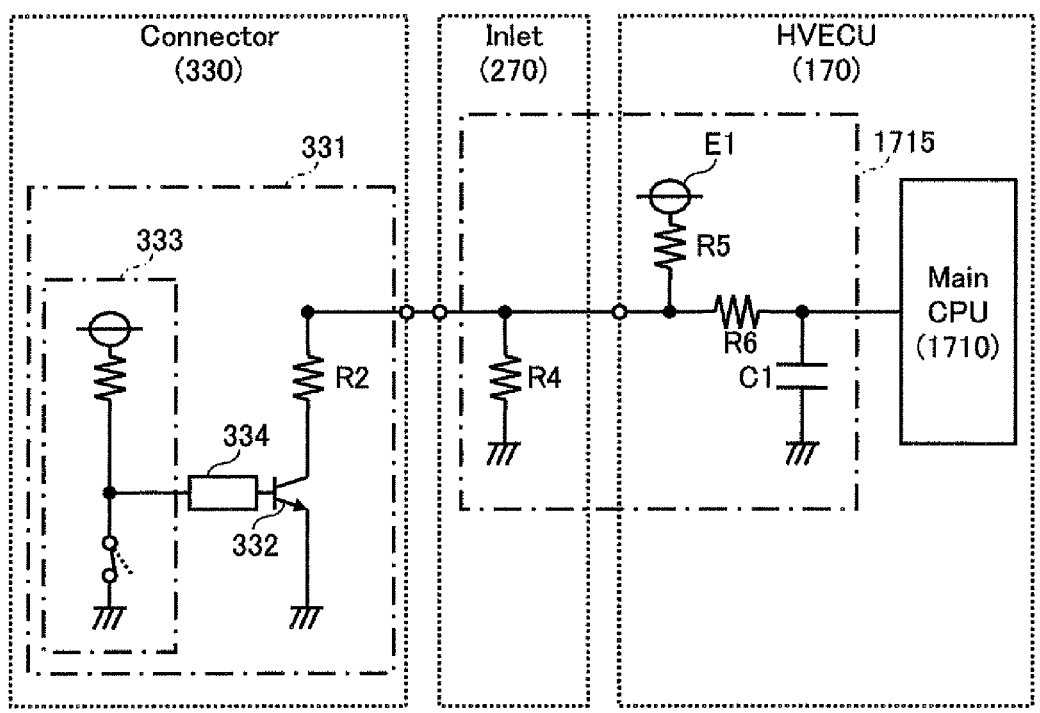
FIG. 10 is a diagram for illustrating a circuit for measuring a terminal voltage of a connection state distinguishing circuit with a connection determining circuit in another embodiment.

For example, referring to FIG. 10, it is possible to employ a second switch circuit 333 for generating a pulse in conjunction with the depression operation of the operation portion 350 such that a switching transistor acting as the above-described switch 332 has its collector connected to the resistor 112, emitter grounded, and, with a trigger of a falling signal of the second switch circuit 333, base input with output of a one-shot multi-vibrator 334 that acts as a timer circuit for outputting a pulse signal for a predetermined period of time such as several tens to several hundreds of milliseconds.

In this case, the switching transistor is turned off for the predetermined period of time such as several tens to several hundreds of milliseconds in an early moment of depression of the operation portion 350, after which conduction is secured.

On the basis of the output value of the connection state distinguishing circuit 1715, the main CPU 1710 may determine that the operation portion 350 of the charging cable 300 has been depressed and interrupt the charging control, and if the level is maintained after an elapse of the predetermined period of time such as several tens to several hundreds of milliseconds, the main CPU 1710 may determine that the charging cable 300 has been disconnected of the charging inlet 270.

Thus, on the basis of whether the fluctuation of the output value of the connection state distinguishing circuit 1715 continues for the predetermined period of time, the main CPU 1710 is able to distinguish whether the switch 332 is OFF-operated on the basis of the operation of the operation portion 350 or the charging cable 300 is disconnected off the vehicle.

While the one-shot multi-vibrator 334 is exemplified as the timer circuit, other timer circuit than the one-shot multi-vibrator, such as CR circuit, may be used insofar as the circuit is able to OFF-operate the switch 332 for a predetermined period of time in conjunction with the depression operation of the operation portion 350.

While in the above embodiment description is made of the example where after detecting that the charging cable 300 has been disconnected off the vehicle on the basis of the output value of the connection state distinguishing circuit 1715, the main CPU 1710 connects the control line L2 to the vehicle earth through the break detecting circuit 1713, such a configuration may be employed that the main CPU 1710 is input with travel speed information SV of the vehicle detected by a vehicle speed detecting device 292 (see FIG. 4), and after detecting that the charging cable 300 has been disconnected off the vehicle, grounds the control line L2 through the break detecting circuit 1713 provided that the travel speed is equal to or higher than a predetermined speed.

When the travel speed is equal to or higher than a predetermined speed, the possibility of connection of the charging cable to the vehicle is extremely low, and thus line breaking can be detected more reliably and safely.

In this case, after the detection of disconnection of the charging cable 300 off the vehicle and when the travel speed of the vehicle is equal to or higher than a first predetermined speed, the main CPU 1710 may connect the control line L2 to the vehicle earth through the break detecting circuit 1713, while when the travel speed of the vehicle is equal to or lower than a second predetermined speed that is lower than the first predetermined speed, the main CPU 1710 may disconnect the control line L2 off the vehicle earth through the break detecting circuit 1713.

Figure 11A:
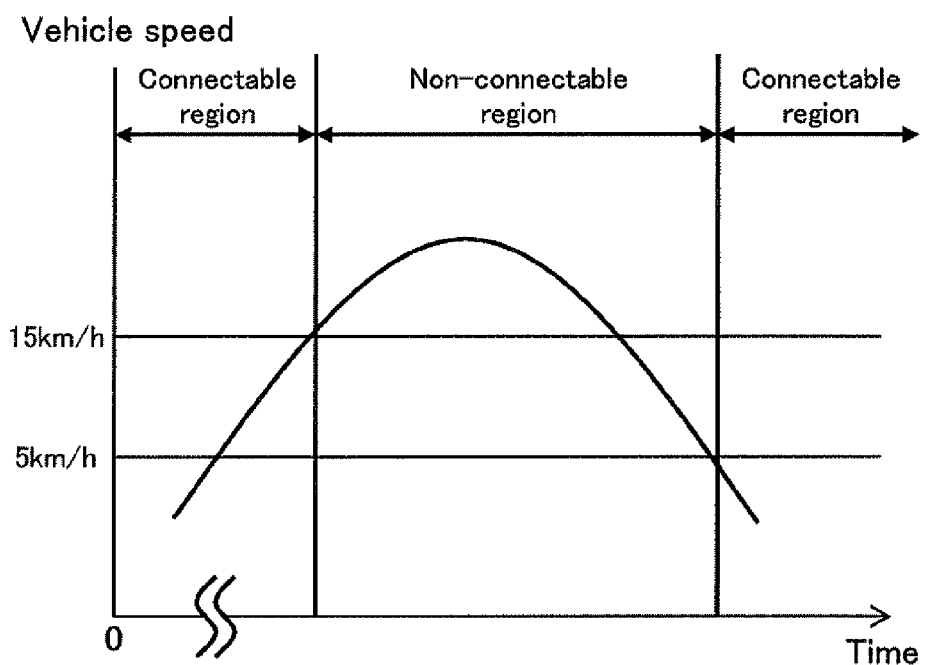
FIG. 11A is a diagram for illustrating a distinguishing method of a charging cable connection state in relation to the travel speed of a vehicle.
Figure 11B:
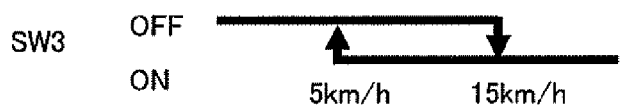
FIG. 11B is a diagram for illustrating a state of a switch of a line-break detection circuit in accordance with the travel speed of the vehicle.

For example, referring to FIGS. 11A and 11B, when the first predetermined speed is set at 15 km/h and the second predetermined speed at 5 km/h, the switch SW3 is turned on at or above the travel speed of 15 km/h after starting of the vehicle, that is, the break detecting circuit 1713 is activated to detect a break of the control line L2, while upon reduction of the travel speed to or below 5 km/h due to an intersection, a signal, or the like, the switch SW3 is turned off, that is, the break detecting circuit 1713 is discontinued.

Thus, setting a threshold value for the travel speed in detecting a break of the control line L2 secures a long period of time during which the break detection can be carried out.

When the operation of the break detecting circuit 1713 is determined on the basis of the travel speed information SV of the vehicle, it is possible to use a connection determining circuit in which the switch 332 is grounded at one end and connected at the other end to the resistor R2 in series, in place of the connection determining circuit 331, which includes the resistor R3, which is connected in parallel to the switch 332, and the timer circuit that OFF-operates the switch 332 for a predetermined period of time in conjunction with the operation of the operation portion 350.

Such a connection determining circuit cannot distinguish between the state in which the operation portion 350 is depressed and the state in which the connector 330 is disconnected off the charging inlet 270. This can be addressed by setting as a predetermined speed a travel speed at which the vehicle cannot possibly travel while the operation portion 350 is being depressed by an operator so that when the travel speed of the vehicle becomes equal to or higher than the predetermined speed, the connection determining circuit can assume that the connector 330 is in the state of being disconnected off the charging inlet 270 and activate the break detecting circuit 1713.

While in the above embodiment description is made of the series/parallel type hybrid vehicle, in which the power dividing mechanism 130 divides the driving power of the engine 100 and transmits it to the driving wheels 160 and the first MG 110, the present invention is applicable to other types of hybrid vehicles.

For example, the present invention is applicable to: what is called series type hybrid vehicles, which use the engine 100 to drive only the first MG 110 and use only the second MG 120 to generate the driving power of the vehicles: hybrid vehicles that retrieve only regenerative power as electrical energy from the kinetic energy generated at the engine 100; and motor-assisted hybrid vehicles, in which the engine provides the main power with the assistance of motors as necessary.

The present invention is further applicable to electrical vehicles, which are provided with motors and no engines 100 and run only on electricity, and to fuel cell vehicles provided with power storage devices in addition to fuel cells.

The embodiments described herein are provided for exemplary purposes, and modifications of the specific circuit configurations and control configurations of each part may be made within the range that the advantageous effects of the present invention can be secured.

What is claimed is:

1. A control system for supplying power from a power source outside a vehicle to a power storage device located in the vehicle, the control system comprising:

a cable through which the power source outside the vehicle feeds the power storage device, the cable including at both ends a power source-side connector for connecting with the power source outside the vehicle and a vehicle-side connector for connecting with the vehicle, the vehicle-side connector including a signal pin, a series resistive element connected to the signal pin at one end, a switch connected in series to the series resistive element at one end and grounded at the other end, and a parallel resistive element connected in parallel to the switch and connected in series to the series resistive element, the switch changing from an ON state to an OFF state upon depression of a depression portion located on the vehicle-side connector by a user, at a time when the vehicle-side connector is connected to the vehicle, or at a time when the vehicle-side connector is disconnected off the vehicle;

a resistive element located in the vehicle, the resistive element being electrically connectable to the signal pin at one end and grounded at the other end; and a control device located in the vehicle, the control device determining a state of the control system on the basis of a signal voltage value input from a signal line electrically connectable to the signal pin.

2. A control system for supplying power from a power source outside a vehicle to a power storage device located in the vehicle, the control system comprising:

a cable through which the power source outside the vehicle feeds the power storage device, the cable including at both ends a first connector for connecting with the power source outside the vehicle and a second connector for connecting with the vehicle, the second connector including a first signal pin, a first resistive element connected to the first signal pin at one end, a switch connected in series to the first resistive element at one end and grounded at the other end, and a second resistive element connected in parallel to the switch and connected in series to the series resistive element, the switch changing from an ON state to an OFF state upon depression of a depression portion located on the second connector by a user, at a time when the second connector is connected to the vehicle, or at a time when the second connector is disconnected off the vehicle;

a third connector located in the vehicle, the third connector including a second pin electrically connectable to the first pin, and a third resistive element connected at one end to the second signal pin and grounded at other end; and a control device located in the vehicle, the control device including a fourth resistive element connected at one end to a signal line electrically connected to the second signal pin and connected at the other end to a power source at a vehicle side, and a control portion for determining a state of the control system on the basis of a signal voltage value input from the signal line.

3. The control system according to claim 2, wherein:

the cable includes: a signal generating portion between the first connector and the second connector, the signal generating portion generating a pulse signal according to a state of power feed to the vehicle; and a signal line electrically connected to a third signal pin located in the second connector, the signal line transmitting the pulse signal generated at the signal generating portion;

the third connector includes a fourth signal pin electrically connectable to the third signal pin; and the control device includes the control portion for determining a state of the control system on the basis of the pulse signal input from a signal line electrically connected to the fourth signal pin.

4. A control device for supplying power from a power source outside a vehicle to a power storage device located in the vehicle, the control device comprising:

a storage portion storing a plurality of voltage values generated by combinations of first to fourth resistive elements included in a control system, the control system including: a cable through which the power source outside the vehicle feeds the power storage device, the cable including at both ends a first connector for connecting with the power source outside the vehicle and a second connector for connecting with the vehicle; a third connector located in the vehicle; and a control device, the second connector including: a first signal pin; a first resistive element, the first resistive element being connected to the first signal pin at one end; a switch connected in series to the first resistive element at one end and grounded at the other end; and the second resistive element, the second resistive element being connected in parallel to the switch and connected in series to the series resistive element, the switch changing from an ON state to an OFF state upon depression of a depression portion located on the second connector by a user, at a time when the second connector is connected to the vehicle, or at a time when the second connector is disconnected off the vehicle, the third connector including a second signal pin electrically connectable to the first signal pin and the third resistive element, the third resistive element being connected at one end to the second signal pin and grounded at other end, and the control device including the fourth resistive element, the fourth resistive element being connected at one end to a signal line electrically connected to the second signal pin and connected at the other end to a power source at a vehicle side; and a control portion for determining a state of the switch and/or a connection state of whether the second connector is connected to the third connector, on the basis of the plurality of voltage values stored in the storage portion and a voltage value input from the signal line.

5. The control device according to claim 4, wherein:

the cable includes: a signal generating portion between the first connector and the second connector, the signal generating portion generating a pulse signal according to a state of power feed to the vehicle; and a signal line electrically connected to a third signal pin located in the second connector, the signal line transmitting the pulse signal generated at the signal generating portion;

the third connector includes a fourth signal pm electrically connectable to the third signal pin; and the control portion determines a state of the control system on the basis of the pulse signal input from a signal line electrically connected to the fourth signal pin.

6. The control device according to claim 4, wherein respective resistance values of the resistive elements are set at mutually different voltage values that are input from the signal line, depending on a state of connection of the cable to the vehicle or a state of depression of the depression portion.

7. A method for determining a state of connection of a cable to a vehicle, the cable being for supplying power from a power source outside the vehicle to a power storage device located in the vehicle, the method comprising the steps of:

inputting to an input portion a signal voltage supplied from a signal line connectable to the cable, through which the power source outside the vehicle feeds the power storage device, the signal line being electrically connectable to a signal pin located in a vehicle-side connector of the cable, the vehicle-side connector including a series resistive element connected to the signal pin at one end, a switch connected in series to the series resistive element at one end and grounded at the other end, and a parallel resistive element connected in parallel to the switch and connected in series to the series resistive element, the switch changing from an ON state to an OFF state upon depression of a depression portion located on the vehicle-side connector by a user, at a time when the vehicle-side connector is connected to the vehicle, or at a time when the vehicle-side connector is disconnected off the vehicle, the vehicle having a resistive element electrically connected at one end to the signal line and grounded at the other end;

determining a state of connection of the cable to the vehicle and/or whether the depression portion is depressed by the user, on the basis of a value of the signal voltage input in the inputting step; and controlling the vehicle on the basis of a result of the determination in the determining step.

* * * * *